US010579059B2

(12) United States Patent
Cantrell et al.

(10) Patent No.: US 10,579,059 B2
(45) Date of Patent: Mar. 3, 2020

(54) SYSTEM AND METHOD FOR UTILIZING DRONES FOR INTERMITTENT FLIGHTS

(71) Applicant: Walmart Apollo, LLC, Bentonville, AR (US)

(72) Inventors: Robert Cantrell, Herndon, VA (US); Donald R. High, Noel, MO (US); Brian McHale, Oldham (GB); John J. O'Brien, Farmington, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/285,825

(22) Filed: Feb. 26, 2019

(65) Prior Publication Data
US 2019/0265707 A1 Aug. 29, 2019

Related U.S. Application Data

(60) Provisional application No. 62/636,802, filed on Feb. 28, 2018.

(51) Int. Cl.
G05D 1/00 (2006.01)
B64D 47/08 (2006.01)
(Continued)

(52) U.S. Cl.
CPC ............ G05D 1/0094 (2013.01); B60L 53/80 (2019.02); B64C 39/024 (2013.01); B64D 47/08 (2013.01);
(Continued)

(58) Field of Classification Search
CPC . G05D 1/00; G05D 1/12; G01C 21/20; B64D 1/12; B64D 47/08
(Continued)

(56) References Cited

U.S. PATENT DOCUMENTS 8,515,596 B2 8/2013 Hamke et al.
9,162,753 B1 10/2015 Panto et al.
(Continued)

FOREIGN PATENT DOCUMENTS

CN 106403954 A 2/2017

OTHER PUBLICATIONS

Pinc, "Warehouse Drones: Real-Time Inventory Tracking by Air", Pinc.com, pp. 1-10.
(Continued)

Primary Examiner — Tan Q Nguyen
(74) Attorney, Agent, or Firm — Venable LLP; Jeffri A. Kaminski

(57) ABSTRACT

A method for utilizing a drone for intermittent flights can include: receiving instructions of a flight mission with a flight route from an original location to a mission destination of the drone, wherein a plurality of stand-by locations are configured for the drone to land on along the flight route; obtaining data of the stand-by locations; scanning a first area between the original location of the drone and a first stand-by location to determine whether the first area is clear; controlling the drone to navigate over the first area along the flight route if the first area is clear; updating a drone position in real time; scanning a second area between an updated drone position and a second stand-by location to determine whether the second area is clear; and controlling the drone to land on the first stand-by location if the second area is not clear.

20 Claims, 4 Drawing Sheets

(51) Int. Cl.
  *B64C 39/02* (2006.01)
  *G05D 1/12* (2006.01)
  *B60L 53/80* (2019.01)
  *B64F 1/36* (2017.01)
(52) U.S. Cl.
  CPC .............. *B64F 1/362* (2013.01); *G05D 1/12* (2013.01); *B60L 2200/10* (2013.01); *B64C 2201/128* (2013.01); *B64C 2201/141* (2013.01)
(58) Field of Classification Search
  USPC ........................................... 701/2, 4, 15, 16
  See application file for complete search history.

(56) References Cited

U.S. PATENT DOCUMENTS

| | | | |
|---|---|---|---|
| 9,488,979 | B1 | 11/2016 | Chambers et al. |
| 9,792,576 | B1 | 10/2017 | Jamjoom et al. |
| 2010/0141206 | A1 | 6/2010 | Agassi et al. |
| 2015/0370251 | A1 | 12/2015 | Siegel et al. |
| 2016/0033966 | A1 | 2/2016 | Farris et al. |
| 2016/0068264 | A1 | 3/2016 | Ganesh et al. |
| 2016/0247116 | A1 | 8/2016 | Olivo et al. |
| 2016/0306351 | A1 | 10/2016 | Fisher et al. |
| 2017/0004714 | A1* | 1/2017 | Rhee .................... G08G 5/0082 |
| 2017/0124789 | A1 | 5/2017 | Rephlo |
| 2017/0270805 | A1 | 9/2017 | Parker et al. |
| 2017/0308087 | A1 | 10/2017 | Tian et al. |
| 2018/0018884 | A1 | 1/2018 | Giusti et al. |
| 2018/0031296 | A1 | 2/2018 | Winkle et al. |
| 2018/0114174 | A1* | 4/2018 | Boland .......... G06Q 10/063112 |
| 2018/0357909 | A1* | 12/2018 | Eyhorn ................. B64C 39/024 |

OTHER PUBLICATIONS

International Search Report and Written Opinion dated May 10, 2019, issued in corresponding PCT Application No. PCT/US2019/019606.

\* cited by examiner

SYSTEM AND METHOD FOR UTILIZING DRONES FOR INTERMITTENT FLIGHTS

CROSS-REFERENCE TO RELATED APPLICATION

This present Patent Application claims priority benefit of U.S. Provisional Application No. 62/636,802, filed Feb. 28, 2018, which is incorporated herein by reference in its entirety.

TECHNICAL FIELD

The present disclosure generally relates to intermittent drone flights.

BACKGROUND

Autonomous vehicles including aerial vehicles, such as unmanned aerial vehicles (UAVs) (e.g., drones), can be used in package deliveries, farmland surveys, search and rescue operations, railway inspections, and surveillance operations, etc. Drones may also be used inside a retail store or a supermarket for conducting inventory management such as cycle counting, moving products, etc. Although the retail store generally has a fairly open inside space where periods of low traffic exist, the store may still have many areas with consistently high traffic. There is a need for drones to conduct intermittent flights during a mission in a way that maximizes drone flight time while performing work and enhancing safety by avoiding interactions with people.

SUMMARY

In an embodiment of the present invention, a method implemented on a drone comprising at least one processor and at least one memory, comprising: receiving, by the processor, instructions of a flight mission with a flight route from an original location to a mission destination of the drone, wherein a plurality of stand-by locations are along the flight route, and wherein each of the plurality of stand-by locations is at a pre-designated location and is configured for the drone to land on; obtaining, by the processor, data of the plurality of the stand-by locations, the data being stored in a database; scanning, by an onboard camera and sensors on the drone, a first area between the original location of the drone and a first stand-by location to determine whether the first area is clear along the flight route; controlling, by the processor, the drone to navigate to the first stand-by location over the first area along the flight route if the first area is clear; updating a drone position in real time; scanning, by the onboard camera and sensors on the drone, a second area between an updated drone position and a second stand-by location to determine whether the second area is clear along the flight route; and controlling, by the processor, the drone to land on the first stand-by location if the second area is not clear.

In another embodiment of the present invention, a system comprising: a central server; a plurality of stand-by locations; a plurality of drones, each of the plurality of drones the comprising at least one processor and a non-transitory computer-readable storage medium having instructions stored which, when executed by the processor, cause the processor to perform operations comprising: receiving, from the central server, instructions of a flight mission with a flight route from an original location to a mission destination of the drone, wherein the plurality of stand-by locations are along the flight route, and wherein each of the plurality of the stand-by locations is at a pre-designated location and is configured for the drone to land on; obtaining data of the plurality of the stand-by locations, the data being stored in a database; scanning, by an onboard camera and sensors on the drone, a first area between the original location of the drone and a first stand-by location to determine whether the first area is clear along the flight route; controlling the drone to navigate to the first stand-by location over the first area along the flight route if the first area is clear; updating a drone position in real time; scanning, by the onboard camera and sensors on the drone, a second area between an updated drone position and a second stand-by location to determine whether the second area is clear along the flight route; and controlling the drone to land on the first stand-by location if the second area is not clear.

In yet another embodiment of the present invention, a non-transitory computer-readable storage medium having instructions stored which, when executed by a computing device, cause the computing device to perform operations comprising: receiving, by the processor, instructions of a flight mission with a flight route from an original location to a mission destination of a drone, wherein a plurality of stand-by locations are along the flight route, and wherein each of the plurality of the stand-by locations is at a pre-designated location and is configured for the drone to land on; obtaining, by the processor, data of the plurality of the stand-by locations, the data being stored in a database; scanning, by an onboard camera and sensors on the drone, a first area between the original location of the drone and a first stand-by location to determine whether the first area is clear along the flight route; controlling, by the processor, the drone to navigate to the first stand-by location over the first area along the flight route if the first area is clear; updating a drone position in real time; scanning, by the onboard camera and sensors on the drone, a second area between an updated drone position and a second stand-by location to determine whether the second area is clear along the flight route; and controlling, by the processor, the drone to land on the first stand-by location if the second area is not clear.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Example embodiments of this disclosure are illustrated by way of an example and not limited in the figures of the accompanying drawings, in which like references indicate similar elements and in which.

Figure 1:
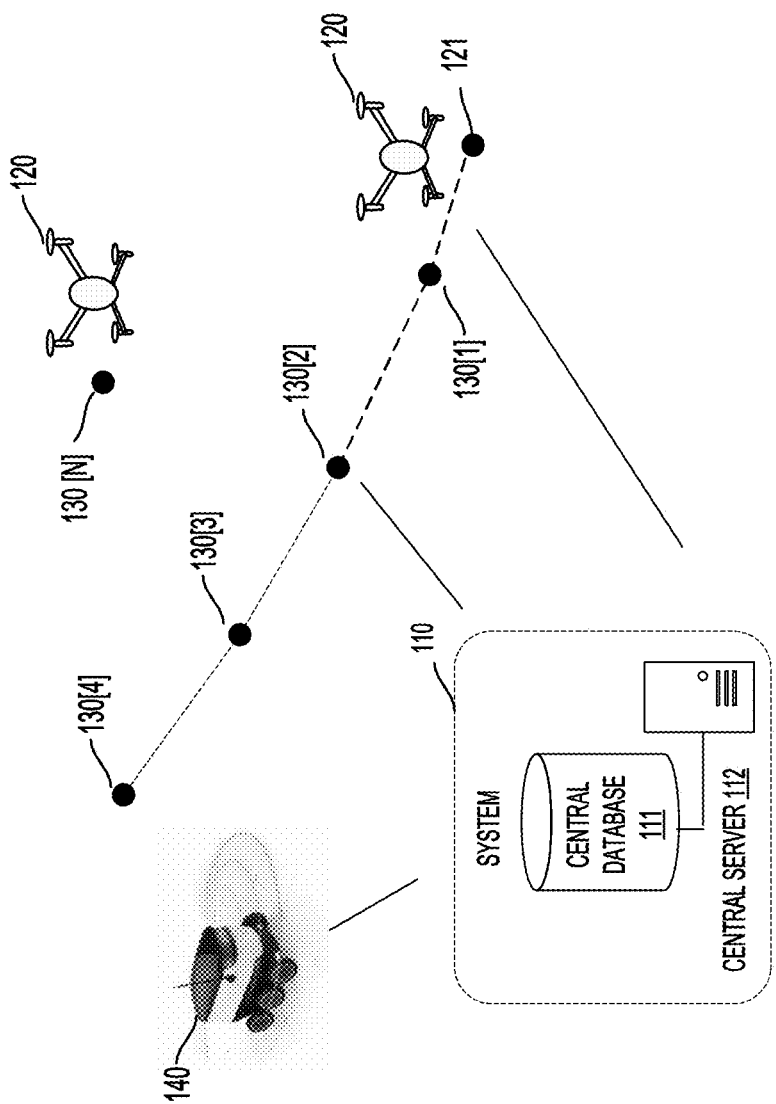
FIG. 1 is a block diagram illustrating an example environment in which some example embodiments may be implemented.

It is to be understood that both the foregoing general description and the following detailed description are example and explanatory and are intended to provide further explanations of the invention as claimed only and are, therefore, not intended to necessarily limit the scope of the disclosure.

DETAILED DESCRIPTION

Various example embodiments of the present disclosure will be described in detail below with reference to the accompanying drawings. Throughout the specification, like reference numerals denote like elements having the same or similar functions. While specific implementations and example embodiments are described, it should be understood that this is done for illustration purposes only. Other components and configurations may be used without parting from the spirit and scope of the disclosure, and can be implemented in combinations of the variations provided. These variations shall be described herein as the various embodiments are set forth.

The concepts disclosed herein are directed to a system and method of intermittent drone flights. This may conserve energy and ensure safety. One potential use of intermittent flights is cycle counting. Cycle counting is an inventory auditing procedure in inventory management to verify the inventory accuracy. Cycle counting may allow a merchant to count a certain number of items at specified locations within a merchant's warehouse, store or other location for a specified period of time without having to count the entire inventory.

One approach is to apply energy conservation and threat avoidance strategies to drone flights. The drones may spend most of the time in a stand-by location, and are flexible about landing locations. A drone may fly from stand-by location to stand-by location when the way is clear, conserving energy while performing work and enhancing safety by avoiding interactions with people. The concepts described herein may enable a drone to fly when needed for missions, but pause on a stand-by location when possible.

The drone may fly inside the store and avoid interactions with people. In some example embodiments, a drone may conduct flight hops through a succession of stand-by locations instead of flying long stretches during a mission. The stand-by locations may be configured to allow a drone to complete its work while using less energy and flitting from place to place. In addition, the stand-by location may be configured to allow the drone to work in high traffic areas because the drone can fly only when there is a break in the crowd. In addition, the drone may not fly over or too closely to people. Therefore, rather than having the long, traditional flights of drones, the drones may flit from spot to spot doing work, for example, making its way to a store-front kiosk and back.

In some example embodiments, the drone may also perform a whole image scan from the stand-by location. The drone may perform a portion scan of an Optical Character Recognition (OCR) of items in the store from a distance. The drone may further recognize changes from partial scans and perform an image comparison. For example, during an inventory scan operation, the drone may fly to a stand-by location and use high resolution cameras with a zoom lens to focus on a particular area of a shelf. The drone may scan an area using high resolution cameras for OCR product inventorying based on image changes to detect products missing, purchased products, pending product transactions, etc. The drone may also move top shelf items within potentially crowded areas.

In some example embodiments, mobile cameras may be installed on the stand-by locations. The mobile cameras may be configured to be movable to capture images or videos of the products on the shelves and to detect image changes.

In some example embodiments, the stand-by locations may be pre-designated locations optimized both for the landings and as sites where the drones may conduct assigned work. This may allow the drone to conserve power, operate more safely around people and recharge while working from the stand-by location. The drone may be configured to detect people around an aisle and decide whether to wait for the aisle to be clear and go to a next stand-by location or to continue the flight mission without waiting.

FIG. 1 is a block diagram illustrating an example environment in which some example embodiments may be implemented. The example environment generally includes a system 110, and a plurality of drones 120, a plurality of stand-by locations 130[1]-[N], and at least one autonomous ground vehicle (AGV) 140.

The system enables the drone to fly when needed for missions, but pause on a stand-by location when possible. For example, the stand-by locations may be located at certain rows or aisles of shelves. Referring to FIG. 1, each of the plurality of stand-by locations 130[1]-[N], where N is a positive integer greater than one, may be framed so as to have an ample room for products carried by the drone. The stand-by location may be a landing area for drones and may be provided with recharging equipment to allow the drones to be recharged and do assigned work, battery swap, etc. Information about the stand-by locations may include stand-by locations and status, such as unassigned, assigned, operable, to be fixed, etc. The information may be stored in a database and be available for components in the system and the drones to access via a network. The stand-by locations may be provided at convenient locations within a store and be configured for monitoring purposes. Each stand-by location may include cameras and sensors to detect the status of the stand-by location and to assist in store cycle counting. For example, when a drone lands on the stand-by location, the stand-by location may detect the landing of the drone and send signals with detected information to the system, for example via cameras. The status of all of stand-by locations in the system may be updated in real time. The cameras and sensors installed on the stand-by locations may be part of a plurality of sensors ranging from localization grids to optics inclusive of infrared, which makes it easy to detect people along routes of the drone flight mission. Audio or echo sensing may be used, particularly given that the distances between stand-by locations are short. Existing sensors and avoid technology may be used with infrared sensors to determine whether the area of the drone flight route is clear for the drone to fly without interacting with people.

The AGV 140 may be utilized in conjunction with drones in package transportation and delivery. The AGV may move, without a human driver aboard, throughout a geographic area in order to interact with a drone. AGVs may include a storage area for storing items delivered by the drone. To facilitate the delivery of a large number of packages, the system may include a central server that generates drone routing configurations, processes data for inventory management, etc.

Referring to FIG. 1, the system 110 may be a network-accessible computing system and may be implemented as a computing infrastructure of one or more servers 112 and databases 111 including processors, memory (data storage), software, data access interface, and other components that are accessible via a mesh network and/or other wireless or wired networks. One or more servers are shown and referred to as a central server 112 for simplicity, and one or more databases are shown and referred to as a central database 111 herein for simplicity. The one or more servers 112 may include one or more processors and memory which may be utilized to operate a drone management system.

Figure 2:
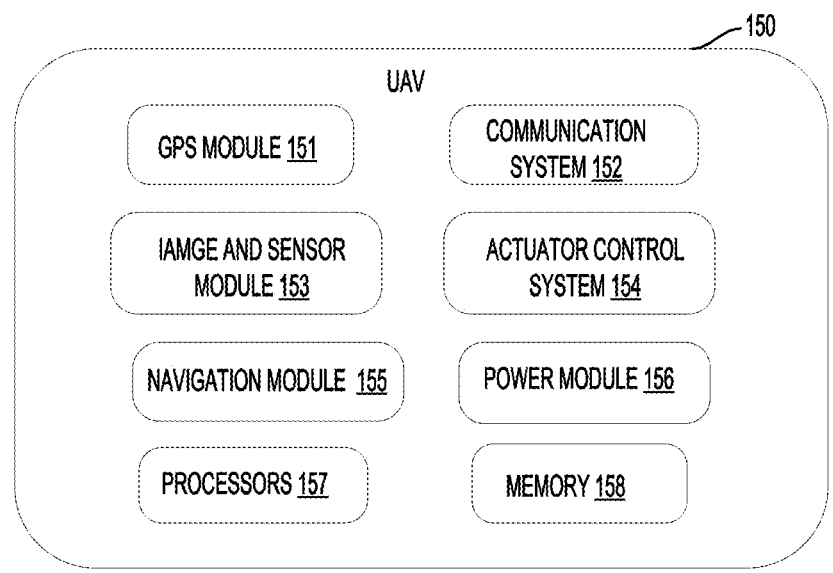
FIG. 2 illustrates an example unmanned aerial vehicle (UAV) in accordance with some example embodiments.

FIG. 2 illustrates an example unmanned aerial vehicle (UAV) in accordance with some example embodiments. Referring to FIG. 2, the UAV 150 or drone may include GPS module 151, communication system 152, image and sensor module 153, actuator control system 154, navigation module 155, power module 156, processors 157 and memory (data storage) 158, and other mechanical components. The communication system 152 may allow the drone to communicate with computing devices or processors in the computing environment for conducting operations and delivering packages. The communication system 152 can be configured to permit the drone to communicate with another drone and the central server 112 on different transmission paths or routes. The communication system 152 may utilize cellular, radio frequency, near field communication, infrared, Bluetooth, Wi-Fi, satellite, or any other means for communication. The processors 157 are in communication with different modules of the drone.

The image and sensor module 153 of the drone may include one or more onboard cameras, one or more visual sensors, proximity sensors, and other types of sensors. These cameras and sensors may be placed on one or more surfaces of the drone. The image and sensor module 153 can determine information on the internal and/or external state of the drone. As such, the sensors can determine the position and movement of the drone. In addition, the sensors can determine one or more internal properties of the drone, including, for example, an amount of energy capable of being provided by the power module 156.

The drone may also include GPS module 151, navigation module 155 and one or more processors 157, which may determine positioning information for the drone, guide drone navigating to a mission destination and conduct specific operations or data analysis.

In some example embodiments, the drone may include mechanical components such as landing feet. The landing feet of the drone may be configured to facility the drone to land on the stand-by locations or other designated areas.

In the example computing environment, a network (not shown) may include satellite-based navigation system or a terrestrial wireless network, Wi-Fi, and other type of wired or wireless networks to facilitate communications between the various networks devices associated with the example environment.

In some example embodiments, the central server 112 may communicate with drones and AGVs via the network to complete missions for store cycle counting, deliver one or more products or conduct specific operations. The central server 112 may receive and monitor various operational parameters of the drone, such as GPS information, flight heights, flight speeds, flight route, package weight, package capacity, battery information, direction, air speed, etc.

Figure 3:
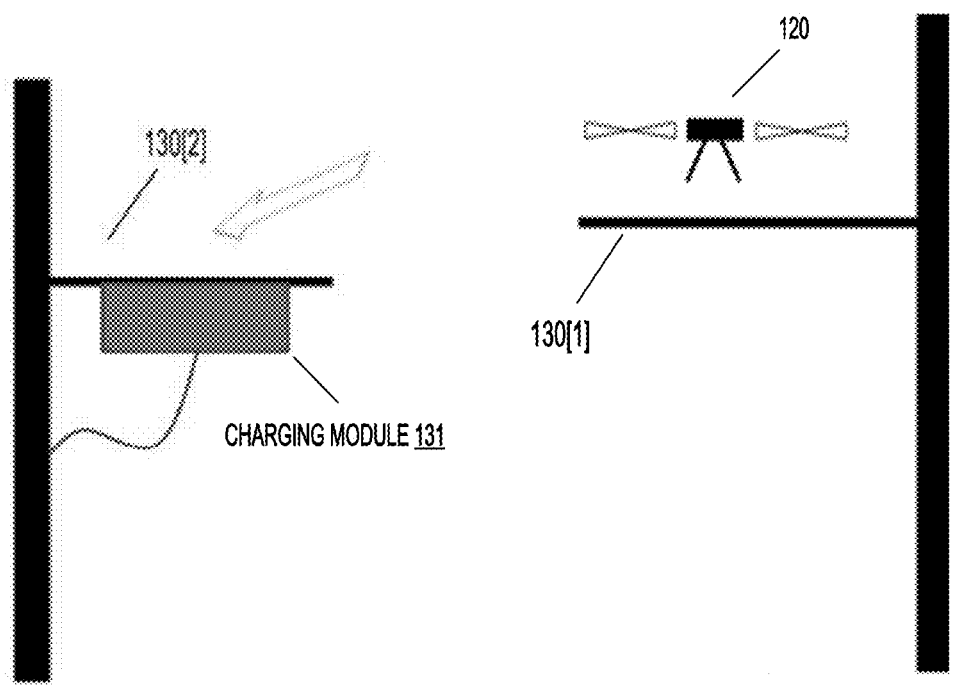
FIG. 3 is a diagram illustrating an example UAV landing on a stand-by location in accordance with some example embodiments.

FIG. 3 is a diagram illustrating an example of a UAV landing on a stand-by location in accordance with some example embodiments. Referring to FIG. 3, a drone 120 may be on a stand-by location 130[1]. When the aisle is clear, the drone 120 may flit to and land on another stand-by location 130[2] along a flight route for conducting assigned work or waiting for an area ahead to be clear. In some example embodiments, stand-by locations may also be framed so as to have an ample room for the drone with the carried product. The stand-by locations may be required to be high enough in excess of a threshold height or otherwise within a distance so as to prevent spontaneous interactions with people. In some example embodiments, a specialized fiber-optic lead may be threaded from the stand-by location to a lens so that the drone may view shelf areas below the stand-by location. In some example embodiments, the stand-by location may be configured to move up and down along a column to accommodate a landing of the drone and to provide a mobile spot with changing heights for the drone to access more shelves to conduct the assigned work.

An elevated stand-by location may be lowered to floor level and have an AGV drive upon it. The stand-by location may then be raised for store cycle counting or other operations. The stand-by location may be fabricated from non-conductive materials including plastics, ceramics and steel or aluminum with non-conductive coatings. In some example embodiments, a stand-by location 130 may include a charging module 131 with conductive and convective charging mechanism that operates like a plug to charge the power module 156 (e.g., drone battery) through the drone landing feet. The landing feet of the drone may be adapted to provide the additional ability to charge a drone battery when the drone is positioned on the conductive and convective charging mechanism of the stand-by location. Referring to FIG. 3, the drone may have an automatic battery charging system and be charged through its feet when it lands on the stand-by location for particular operations or waits for the aisle to be clear to go to the next spot. The drone may have a battery swapping system and have batteries swapped to keep accumulated power for conserve energy.

Figure 4:
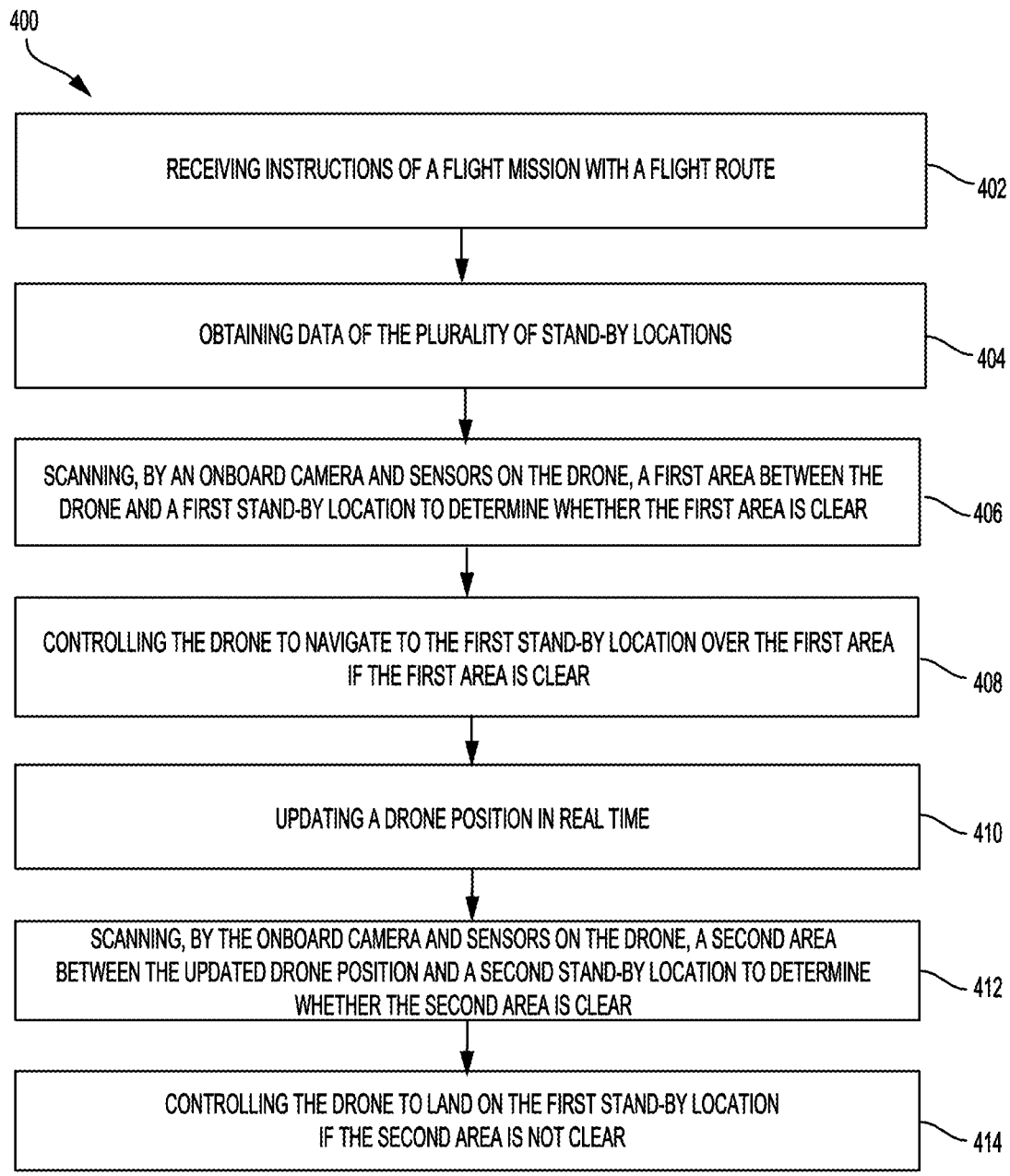
FIG. 4 is a flowchart diagram illustrating a method for utilizing drones for intermittent drone flights in accordance with some example embodiments.

FIG. 4 is a flowchart diagram illustrating an example process 400 for intermittent drone flights. The process 400 may be implemented on a drone with at least one processor and at least one memory in the above described systems and may include the following steps in some example embodiments. The steps may be omitted or combined depending on the operations being performed.

In step 402, the processor of the drone may receive instructions of a flight mission with a flight route from an original location 121 to a mission destination of the drone. Referring back to FIG. 1, the central server 112 in the system 110 may generate the instructions of the mission for the drone based on an original location 121 of the drone and the flight mission. The drone may wait for the instructions of the flight mission at the original location 121. Based on the instructions, a plurality of stand-by locations 130[1]-[4] are along the flight route. Each of the plurality of the stand-by locations may be at a pre-designated location and be configured for the drone to land on.

In some example embodiments, the instructions of the mission may further comprise mission destination, drone original location, package original location, package destination, package weight, package capacity, operational parameters of the drone, flight route, and assigned work. The operational parameters of the drone may comprise GPS information, flight heights, flight speeds, flight route, package weight, package capacity, battery information, direction, air speed, etc.

In step 404, the processor may obtain data of the plurality of the stand-by locations. The system may store stand-by location data and update a stand-by location status to show whether the stand-by location is unassigned, assigned, operable, to be fixed, etc. It may determine which of the stand-by locations are along the mission route.

In step 406, an onboard camera and sensors on the drone may scan a first area between the original location 121 of the drone and a first stand-by location to determine whether the first area is clear along the flight route.

In step 408, the processor may control the drone to navigate to the first stand-by location over the first area along the flight route if the first area is clear. The drone may have to wait at the original location 121 to start the flight mission until the first area is clear.

In step 410, a drone position may be updated in real time by the processor. For example, the position of the drone may be updated while the drone navigates over an area along the flight route after determining an area is clear.

In step 412, the onboard camera and sensors on the drone may be used to scan a second area between the updated drone position and a second stand-by location while the drone navigates over the first area to determine whether the second area is clear.

In step 414, the processor may control the drone to land on the first stand-by location if the second area is not clear. The drone may conduct cycling counting or perform other actions while flying or landing on a stand-by location.

In some example embodiments, the processor may control the drone to continuously navigate to the second stand-by location over a second area along the flight route without a break if the second area is clear. The processor may control the drone to pass or land on the stand-by locations along the flight route until the drone 120 safely arrives at a mission destination or last stand-by location 130[4] of the flight route, as shown in FIG. 1.

If a clear pathway exists, the drone may perform an entire flight route without a break. During the flight, the drone may continuously check whether the area ahead is clear during a present area of flight route. If the area ahead is not clear, the processor of the drone may control the drone to land on a nearby stand-by location.

In some example embodiments, the drones have high speed and maneuverability and cameras of high-frame rates to obtain acceptable images despite fast movement and possibly sub-optimal lighting. Data captured by the drone may be saved if data frames saved instead of continual streams. For example, autonomous editing may be a way to upload footage to the central server. The footage may be auto-trimmed to keep one frame per bar code of products.

Some drones may use the method described above to capture images but do not process the image. For example, light weight drones with lower resolution cameras may be assigned to do inventory management. Another aerial system or other ground system may perform analysis on the images, for example, comparing images to identify changes. Image changes may also be captured and processed by fixed-mount cameras on the drones.

Some stand-by functions may allow multiple drones to work together. For example, when two drones operate together, one may be stripped down to focus on identifying changes, and another may be more robust to conduct a close investigation of the specifics.

Drones may work on or over a limited set of shelves and drop products into a specific conveying mechanism for conveyance under the floor. Some drones may be assigned for partial tasks during a complete delivery.

In some example embodiments, the drone may have an asymmetrical shape with extensions configured to counterbalance a product carried by the drone. The drone may insert a portion, such as an extension, into a slot on the walls, shelves and any other surface areas. A drone may have extensions to fit in the slot and have the flexibility to land in a nearby slot when needed. The extension can friction fit or otherwise be secured into the slot so the slot can support the drone while the drone is waiting.

In some example embodiments, there may be some security rules for drones to follow. Drones may be given a security rule to keep their cameras employed during periods when the presence of a person keeps them from flying to their next stand-by location.

In one example embodiment, some drones may only operate in the back room and take products to a ground vehicle that can carry the products to a kiosk near customers. The drone may be instructed to place the products safely apart.

In some example embodiments, the drone may has a required space buffer (e.g., distance) between the drone itself and people as programmed and mapped on x, y, and z-axes in order to separate incompatible objects.

In some example embodiments, the multiple drones with video camera resources can make a "pop-up" Closed-Circuit Television (CCTV) network while on the stand-by locations.

Figure 5:
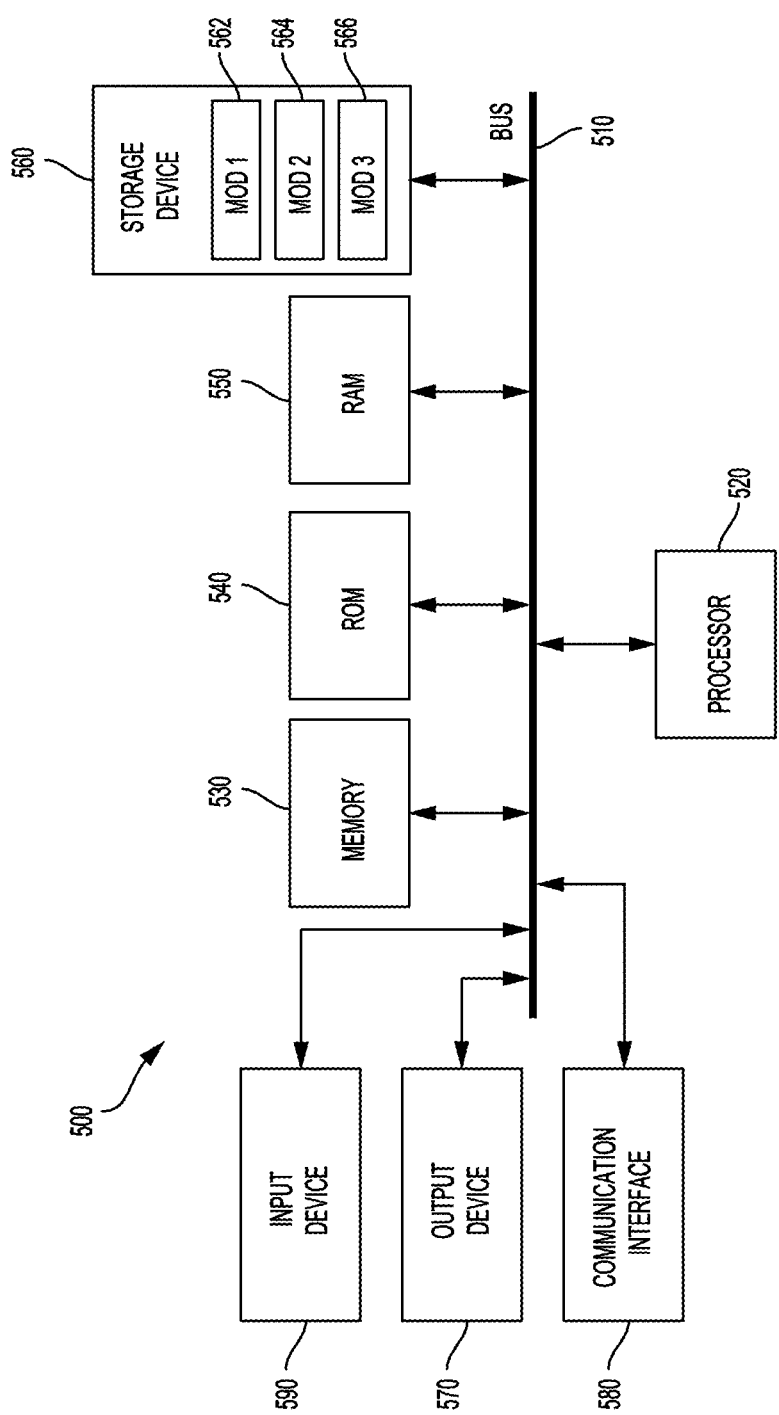
FIG. 5 is a block diagram of an example computer system in which some example embodiments may be implemented.

FIG. 5 illustrates an example computer system 500 which can be used implement embodiments as disclosed herein. The computing system 500 may be a server, a personal computer (PC), or another type of computing device. With reference to FIG. 5, an example system 500 can include a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A method implemented on a drone comprising at least one processor and at least one memory, comprising:
    receiving, by the processor, instructions of a flight mission with a flight route from an original location to a mission destination of the drone, wherein a plurality of stand-by locations are along the flight route, and wherein each of the plurality of stand-by locations is at a pre-designated location and is configured for the drone to land on;
    obtaining, by the processor, data of the plurality of the stand-by locations, the data being stored in a database;
    scanning, by an onboard camera and sensors on the drone, a first area between the original location of the drone and a first stand-by location to determine whether the first area is clear along the flight route;
    controlling, by the processor, the drone to navigate to the first stand-by location over the first area along the flight route if the first area is clear;
    updating a drone position in real time;
    scanning, by the onboard camera and sensors on the drone, a second area between an updated drone position and a second stand-by location to determine whether the second area is clear along the flight route; and
    controlling, by the processor, the drone to land on the first stand-by location if the second area is not clear.

2. The method of claim 1, further comprising controlling the drone to continuously navigate to the second stand-by location over the second area along the flight route without a break if the second area is clear.

3. The method of claim 1, wherein the drone has an unsymmetrical shape with extensions configured to counterbalance a product carried by the drone, and wherein the drone goes into slots of a stand-by location while the stand-by location does not extend outward.

4. The method of claim 1, wherein the instructions of the flight mission further comprise mission destination, a drone original location, package original location, package destination, package weight, package capacity, operational parameters of the drone, flight route, and assigned work.

5. The method of claim 4, wherein the assigned work conducted by the drone comprises conducting cycle counting operations using on-board high resolution camera and sensors during a flight and when landing on a stand-by location.

6. The method of claim 4, wherein the assigned work conducted by the drone comprises picking up a product from the package original location and delivering the product to the package destination.

7. The method of claim 1, wherein each stand-by location is configured to move up and down along a column to accommodate a landing of the drone and to provide a mobile spot with changing heights for the drone to access more shelves to conduct an assigned work.

8. The method of claim 1, wherein the stand-by locations are configured to be framed so as to have an ample room for the drone with a carried product, and wherein the stand-by locations are high enough in excess of a threshold height or within a predefined buffer so as to prevent interactions with customers.

9. The method of claim 1, wherein each stand-by location is configured to provide battery charging and battery swap to the drone.

10. A system comprising:
    a central server;
    a plurality of stand-by locations;
    a plurality of drones, each of the plurality of drones the comprising at least one processor and a non-transitory computer-readable storage medium having instructions stored which, when executed by the processor, cause the processor to perform operations comprising:
    receiving, from the central server, instructions of a flight mission with a flight route from an original location to a mission destination of the drone, wherein the plurality of stand-by locations are along the flight route, and wherein each of the plurality of the stand-by locations is at a pre-designated location and is configured for the drone to land on;

obtaining data of the plurality of the stand-by locations, the data being stored in a database;

scanning, by an onboard camera and sensors on the drone, a first area between the original location of the drone and a first stand-by location to determine whether the first area is clear along the flight route;

controlling the drone to navigate to the first stand-by location over the first area along the flight route if the first area is clear;

updating a drone position in real time;

scanning, by the onboard camera and sensors on the drone, a second area between an updated drone position and a second stand-by location to determine whether the second area is clear along the flight route; and controlling the drone to land on the first stand-by location if the second area is not clear.

11. The system of claim 10, wherein the operations further comprise controlling the drone to navigate to the second stand-by location over the second area along the flight route without a break if the second area is clear.

12. The system of claim 10, wherein the drone has a unsymmetrical shape with extensions configured to counterbalance a product carried by the drone, and wherein the drone goes into slots of a stand-by location while the stand-by location does not extend outward.

13. The system of claim 10, wherein the instructions of the flight mission further comprise mission destination, drone original location, package original location, package destination, package weight, package capacity, operational parameters of the drone, flight route, and assigned work.

14. The system of claim 13, wherein the assigned work conducted by the drone comprises conducting cycle counting operations using on-board high resolution camera and sensors during a flight and when landing on a stand-by location.

15. The system of claim 13, wherein the assigned work conducted by the drone comprises picking up a product from the package original location and delivering the product to the package destination.

16. The system of claim 10, wherein the stand-by location is configured to move up and down along a column to accommodate a landing of the drone and to provide a mobile spot with changing heights for the drone to access more shelves to conduct an assigned work.

17. The system of claim 10, wherein the stand-by locations are configured to be framed so as to have an ample room for the drone with a carried product, and wherein the stand-by locations are high enough in excess of a threshold height or within a predefined buffer so as to prevent interactions with customers.

18. The system of claim 10, wherein each stand-by location is configured to provide battery charging and battery swap to the drone.

19. A non-transitory computer-readable storage medium having instructions stored which, when executed by a computing device comprising a processor, cause the computing device to perform operations comprising:

receiving, by the processor, instructions of a flight mission with a flight route from an original location to a mission destination of a drone, wherein a plurality of stand-by locations are along the flight route, and wherein each of the plurality of the stand-by locations is at a pre-designated location and is configured for the drone to land on;

obtaining, by the processor, data of the plurality of the stand-by locations, the data being stored in a database;

scanning, by an onboard camera and sensors on the drone, a first area between the original location of the drone and a first stand-by location to determine whether the first area is clear along the flight route;

controlling, by the processor, the drone to navigate to the first stand-by location over the first area along the flight route if the first area is clear;

updating a drone position in real time;

scanning, by the onboard camera and sensors on the drone, a second area between an updated drone position and a second stand-by location to determine whether the second area is clear along the flight route; and controlling, by the processor, the drone to land on the first stand-by location if the second area is not clear.

20. The non-transitory computer-readable storage medium of claim 19, wherein the operations further comprise:

controlling the drone to continuously navigate to the second stand-by location over the second area along the flight route without a break if the second area is clear.

* * * * *